July 3, 1923.

A. KÉGRESSE 1,460,656

TRACK BELT FOR MOTOR VEHICLES

Filed March 30, 1921

INVENTOR
Adolphe Kégresse
BY
ATTORNEY

Patented July 3, 1923.

1,460,656

UNITED STATES PATENT OFFICE.

ADOLPHE KÉGRESSE, OF PARIS, FRANCE.

TRACK BELT FOR MOTOR VEHICLES.

Application filed March 30, 1921. Serial No. 457,110.

*To all whom it may concern:*

Be it known that I, ADOLPHE KÉGRESSE, citizen of the Republic of France, and resident of Paris, France, have invented a new and useful Improved Track Belt for Motor Vehicles (for which I have filed an application in France on June 14, 1916, Patent No. 482,034), which improvements are fully set forth in the following specification.

Track belts used at present in motor vehicles mostly consist of metal bands composed of a series of links of more or less complicated construction. These metal belts of whatever type they may be, have necessarily no great degree of suppleness; further they are also necessarily noisy, heavy, without any elasticity and it is not an easy matter to drive them. All those drawbacks do not allow of such belts being used on vehicles which have to be run at a more than moderate speed.

The present invention has for its object the provision of an improved belt in which all of the foregoing objections have been overcome.

The invention will now be described with reference to the accompanying drawings which illustrate one form of the improved track belt. In these drawings.

The improved belt is composed of rubberized fabric. It comprises two flat portions 1, 1 constituting the base of the belt, a central portion 2 composed of a series of rectangular blocks having a semi-conical shape in one direction (that shown in Fig. 2), and conical in the other direction (shown in Fig. 1), two continuous projecting tread portions, 3, 3, made of rubber, and suitable soil-gripping projections 4 (Fig. 3) more particularly suitable for use on soft ground.

Each of the parts 1, 2, 3 and 4 is designed to effect a separate and definite result.

The improved belt rests with its flat portions 1, 1 on the driving wheels. These flat portions also engage with the guide rollers that distribute the load over the driving stretch of the belt.

Figure 2:
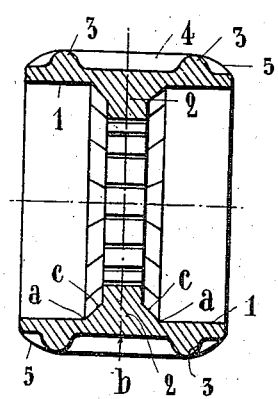
Fig. 2 is a cross section on the line A of Fig. 1.
Figure 1:
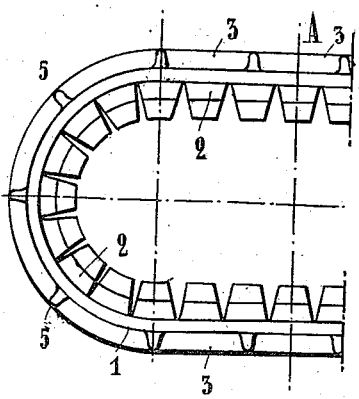
Fig. 1 is a side elevation of a part of the belt.
Figure 3:
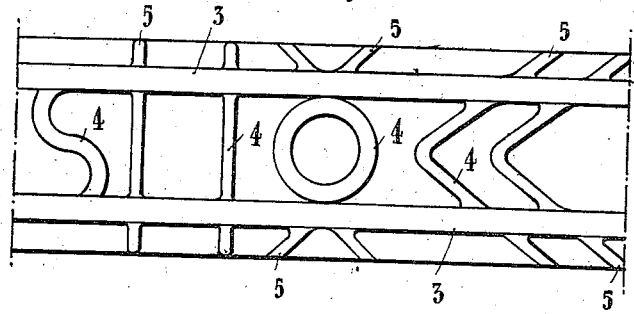
Fig. 3 is a plan of a portion of the improved belt.

The blocks 2 are designed to guide the belt and to prevent it from slipping off the driving wheels, which are provided with suitable grooves, in the turning movements of the vehicle. These blocks 2 are semi-conical as shown in Fig. 2, in order to prevent the belt from being cut through at the points $a$, $a$, if the belt should happen to pass with its centre over a hard body such as a stone, represented in Fig. 2 by an arrow $b$. In such a case the conical parts $c$, $c$ which have a tendency to enter more deeply into the grooves of the driving wheels or pulleys, bear normally against the inner sides of the said wheels or pulleys and thus avoid the cutting above referred to. Further, the wheels or pulleys which are shaped to correspond with the shape of the belt, facilitate by reason of their conical groove, the entry of the blocks 2. These blocks have another conical face for the purpose of ensuring the suppleness of the belt mainly during the passage of the latter over the wheels or pulleys, as shown in Fig. 1.

The blocks thus formed may also allow of driving the belt directly by toothed wheels.

The projecting tread portions 3 act in a certain way as rails; they ensure the continuity of the rolling motion notwithstanding the variously shaped driving projections fixed between them. Further, they form an elastic buffer between the ground and the bearing parts of the wheels or pulleys and rollers; and since they are disposed opposite the plane portions 1 of the inner surface of the belt, over which the said rollers travel, the latter will have a tendency to press them against the ground, as will be understood. On hard ground such as a road for instance, they prevent the outer flat portions from being prematurely worn out.

The purpose of the projections 4 is obvious; they serve to provide a bearing upon soft ground. In fact when the lower horizontal surface of the tread portions and the projections is not sufficient to grip the ground over which the vehicle is travelling, the belt will sink in until the flat portions also take their share in bearing the load. In this case the projections leave upon the ground impressions which will prevent the belt from slipping. The parts 5 (Fig. 2) of these projections are of special shape in cross-section, said parts having a gradually increasing thickness or curvature starting from the outer edges of the belt and continuing up to the projections 3. This detail is of importance because it allows of the belts side-slipping over the ground in the turning movements of the vehicle.

I claim as my invention:

1. A track belt for automobiles, comprising an endless band of rubberized fabric having on its inner surface an endless line of integral blocks spaced midway between the edges thereof and adapted to engage the peripheral surfaces of the driving wheels around which the belt is to pass, so as to guide the belt in its movements; said belt having on each side of said line of blocks a continuous, plane portion for engagement by the guide rollers which distribute the load over the driving stretch of the belt, and having on its outer surface continuous, integral tread projections forming track rails and integral ground-gripping projections, the rail-forming projections on the outer surface of the belt being located opposite the plane portions of the inner surface.

2. A track belt for automobiles, comprising an endless band of rubberized fabric having on its inner surface an endless line of integral blocks spaced midway between the edges thereof and adapted to engage the peripheral surfaces of the driving wheels around which the belt is to pass, so as to guide the belt in its movements; said belt having on each side of said line of blocks a continuous, plane portion for engagement by the guide rollers which distribute the load over the driving stretch of the belt, and having on its outer surface two continuous, integral ribs disposed in spaced, parallel relation and forming track rails, and integral, transversely-arranged ground-gripping projections disposed between said track rails and intersecting the same, the rail-forming projections on the outer surface of the belt being located opposite the plane portions of the inner surface.

In testimony whereof I have signed this specification in the presence of two subscribing witnesses.

ADOLPHE KÉGRESSE.

Witnesses:
FERNAND DUFOUR,
CHARLES LEON LAISEL.